April 28, 1970     G. ROSSI     3,508,693

AUTOMATIC TEARING DEVICE FOR CONTINUOUS COUPLING MACHINES

Filed April 29, 1968     2 Sheets—Sheet 1

INVENTOR:
GIUSEPPE ROSSI

INVENTOR:
GIUSEPPE ROSSI

United States Patent Office 3,508,693
Patented Apr. 28, 1970

3,508,693
AUTOMATIC TEARING DEVICE FOR
CONTINUOUS COUPLING MACHINES
Giuseppe Rossi, Carugate, 20127, Italy
(% Ing. Misitano A.G., Via Padova 217, Italy)
Filed Apr. 29, 1968, Ser. No. 724,712
Claims priority, application Italy, June 9, 1967,
17,035/67
Int. Cl. B26f 3/02
U.S. Cl. 225—96.5   5 Claims

ABSTRACT OF THE DISCLOSURE

The invention concerns an automatic tearing device for plastics film, particularly for continuous coupling machines. It comprises a pair of feed rollers for feeding coupled cardboard sheets in marginal superimposed relationship and connected to each other by the plastics film, a pair of superposed incision rollers. The upper roller of the incision rollers is formed with a number of spikes or a rechangeable blade and the co-operating lower roller has an elastic covering so as to incise the end of the plastics film adjacent the superimposed margin and a pair of tearing rollers located upstream of the incision rollers. The tearing rollers operate to drag the plastified coupled sheets with a higher translation speed than the feed rollers so as to cause a progressive divergent tearing of the plastics film adjacent the superimposed margin of two subsequent sheets.

---

This invention relates to an automatic tearing device more particularly for continuous coupling machines, namely, machines for coupling a plastics film to a sequence of sheets, e.g., of paperboard, the latter being either manually or automatically fed. The film is, in some embodiments, manually torn, thus causing a waste of labour while in other embodiments the film is automatically torn by means of a tearing device controlled by a photo-electric cell device, with the drawback of higher installation costs and the necessity of printing spots to energize the photo-electric cell.

An object of the invention is to overcome the above drawbacks.

According to the present invention there is provided an automatic tearing device for plastics film, particularly for continuous coupling machines, comprising a pair of feed rollers for feeding coupled cardboard sheets in marginal superimposed relationship and connected to each other by the plastics film, a pair of superposed incision rollers, the upper roller of which has a number of spikes and the cooperating lower roller having an elastic covering so as to incise the end of the plastics film adjacent the superimposed margin and a pair of tearing rollers located upstream of the incision rollers, for dragging the plastified coupled sheets with a higher translation speed than the feed rollers so as to cause a progressive divergent tearing of the plastics film adjacent the superimposed margin of two subsequent sheets.

According to a preferred feature of the invention a micro-adjustment gearing is provided that times, namely, puts in phase coincidence the incision rollers so that the incision to tearing step always takes place at a preestablished line, the said adjustment being carried out without stopping the drive of the coupling machine.

The invention further optionally provides, without stopping the coupling machine, for the altering of the distance between the spikes of the upper incision roller and the co-operating lower roller, the latter presenting a covering of elastic material such as rubber or the like, so that any work conditions may be accomplished with particular reference to the thickness of the coupled sheets and to their length.

The invention will be further described by way of example with reference to the accompanying drawings in which.

Figure 1:
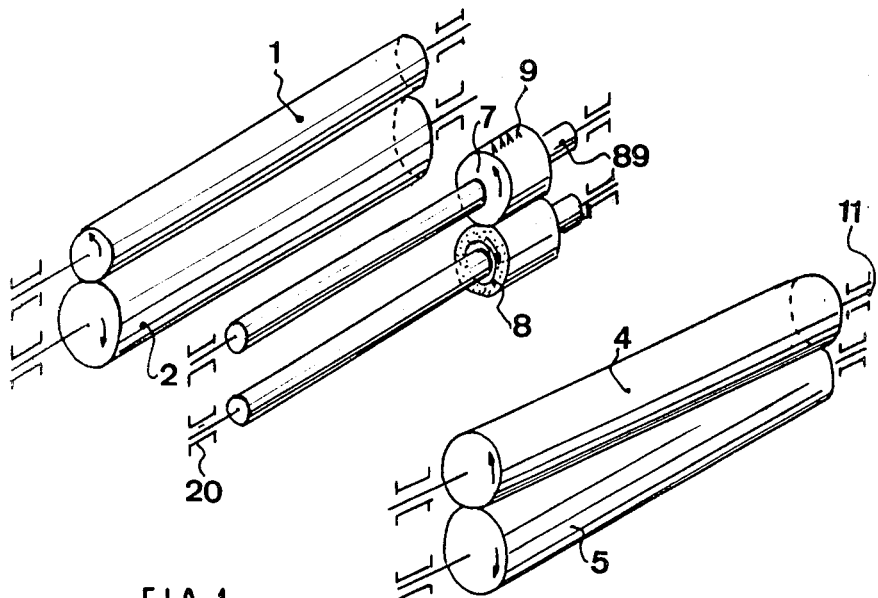
FIG. 1 is a schematic perspective view of the film tearing device according to this invention.

Referring now to the drawings in detail the feed press rollers 1 and 2 carry in the direction of arrow K cardboard sheets F plastified, i.e., coupled by a plastics film *v* in a manner known per se, these sheets are carried along at the same speed as the other rollers of the coupling machine.

Upstream of the feed rollers 1 and 2 there is provided a pair of incision rollers 7 and 8 for the film *v* so as to incise the film end along the superposition line N. These incision rollers comprise an upper incision roller and a lower co-operating counter-roller 8, having a covering of elastic material such as rubber or the like.

Figure 2:
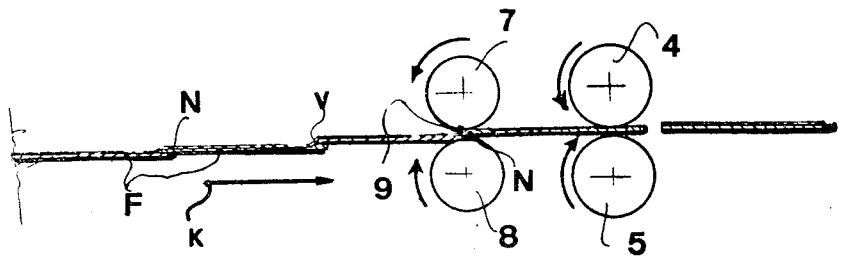
FIG. 2 is an elevational side view of the device shown in FIG. 1.

Adjacent the outlet of the coupling machine there are arranged a pair of tearing rollers 4 and 5. A train of spur wheels drive the rollers in the direction shown by the arrows. The speed of the incision roller 7, provided with incision spikes 9 or of a replaceable blade or the like, may be adjusted by means of a stepless change speed gear (not represented) so that the incision spikes 9 always coincide with the superposition line N of the coupled sheets F (see FIG. 2). The tearing device may be by this way adjusted according to the length of the sheets F to be plastified for different sequences of the work.

The peripheral speed of the tearing rollers 4 and 5 is adjusted higher than the speed of the feed rollers of the coupling machine, this being obtained by means of a train of spur wheels (not represented).

Figure 3:
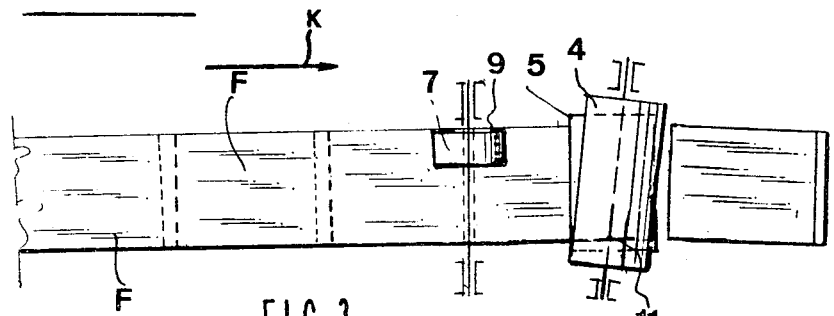
FIG. 3 is a schematic plan view of the device shown in FIG. 2.
Figure 4:
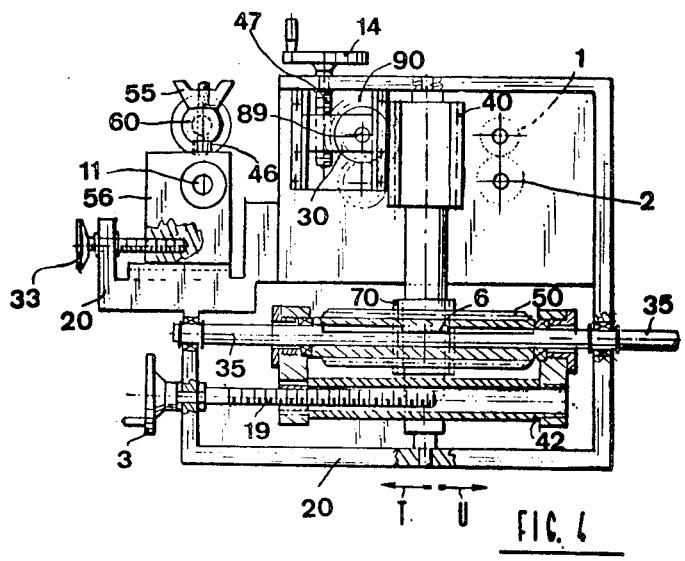
FIG. 4 is a schematic sectional elevational view showing the micro-adjustment gearing for the synchronization of the tearing device.

In order to obtain a progressive and divergent tearing of the film from the film incision end adjacent to the superposition line, at least one of the shafts of the tearing rollers 4 or 5, for example, the shaft 11 of the roller 4 is mounted with its axis at an incline with respect to the other rollers (see FIGS. 1 and 3).

The frame of the coupling machine is indicated by reference 20 and may be of any suitable design.

The micro-adjustment gearing for synchronizing the incision roller will be hereinafter particularly described.

The drive shaft 35 drives by means of the key 6 a helical gear wheel 50 which in turn drives a helical gear wheel 70, the shaft of the latter being mounted to idle in the stationary frame of the coupling machine 20; the gear wheel 40 is fixed with the gear wheel 70 which is in mesh with the helical wheel 90, the shaft 89 of which is horizontal and carries the incision roller 7. It is clear that the helical gear wheels 50 and 70 at one side and the helical gear wheels 40 and 90 at the other side constitute two pairs of orthogonal helical gear wheels. The helical gear wheel 50, constituting the drive gear wheel, is mounted within a first slide 42 that may be translatively shifted in the direction of the arrows T and U (see FIG.

4) by means of a threaded bolt 19 driven by a hand wheel 3. This threaded bolt 19 engages a threaded hole formed in the slide 42; the latter is prevented from rotating by the drive shaft 35 revolving in bearings of the stationary frame of the coupling machine 20. The helical gear wheel 90 and therefore of the spikes 9 adjust the tion namely an advance or delayed rotation according to the shifting direction of the slide 42 according to the arrow T or U, such as phasing "additional" rotation being possible even without stopping the coupling machine. In order to coincide the phase of the shaft 35 with the shaft 89 of the incision roller 7, it is sufficient to turn the handwheel 3 in one or the other direction so that rotation of shaft 89 is synchronized with respect to the drive shaft 35.

Figure 5:
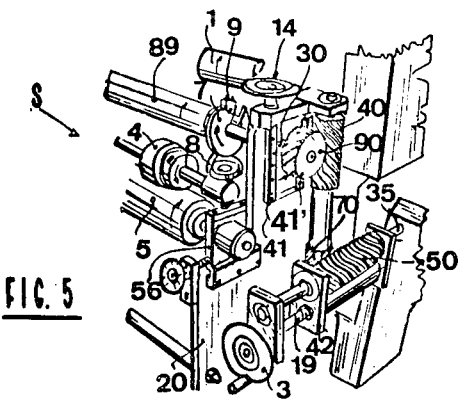
FIG. 5 is a perspective view partly in section as seen in the direction of arrow A of FIG. 6 showing the micro-adjustment gearing.

The shaft 89 of the incision roller 7 is mounted to rotate in a second slide 30, mounted to slide along two opposite guides 41 and 41' (see FIG. 5) fixed to the frame of the coupling machine 20, the said slide 30 being shifted upwards and downwards in a manner known per se by a threaded bolt 47 and a handwheel 14. It is evident that the translation movement of the orthogonal helical gear wheel 90 and therefore the spikes 9 adjust the tearing device to the work namely to the thickness of the coupled cardboard sheets F and causes a dephasing of the two shafts 89 and 35 in the sense outlined above and therefore such a dephasing may be corrected by means of the micro-adjustment gearing as hereinbefore explained. Therefore the adjustment device is operated for the adjustment of the spikes distance from the co-operating roller 8 as well for adjusting the tearing device to the angular phase of the drive shaft 35. The adjustment for the length of the sheets is provided by the stepless change speed gear.

An end 11 of the roller 4 and that of the roller 5, constituting the pair of tearing rollers are mounted to revolve in a third slide 56 that may be shifted inwards and outwards, in a manner known per se along the frame of the coupling machine 20 by means of a threaded bolt and handwheel 33 so that it is possible to alter the angle of the axes of the pair of tearing rollers with respect to the other roller axis. Such a condition is very favourable in view of the different properties of the plastic film used to plastify, i.e. couple the cardboard sheets.

The rollers 4 and 5 are elastically pressed against one another by providing two threaded handwheels 55 pressing two bushes 60 upwards by helical return springs 46, the latter being compressed between the bushes 60 and the frame of the coupling machine 20.

Figure 6:
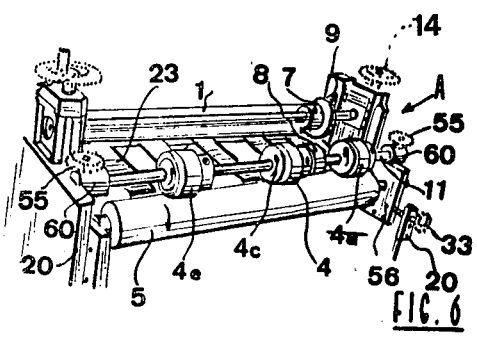
FIG. 6 is a perspective view as seen in the direction of the arrow S of FIG. 4 showing the tearing rollers as well as the slide grate for the sheets just before the tearing of the film end.

Finally a grate 23 is provided that secures a slide surface for the plastified sheets just before the plastic film is torn. As can be seen from FIG. 6 the roller 4 is preferably formed by a number of sections 4a, 4c, 4e.

What I claim is:

1. An automatic tearing device for plastics film, particularly for continuous coupling machines, comprising a pair of feed rollers for feeding coupled cardboard sheets in marginal superimposed relationship and connected to each other by the plastics film, a pair of superposed incision rollers, the upper roller of which has a number of spikes and the co-operating lower roller has an elastic covering so as to incise the end of the plastics film adjacent the superimposed margin and a pair of tearing rollers located upstream of the incision rollers, for dragging the plastified coupled sheets with a higher translation speed than the feed rollers so as to cause a progressive divergent tearing of the plastics film adjacent the superimposed margin of two subsequent sheets.

2. An automatic tearing device according to claim 1 wherein the axis of at least one tearing roller is inclined with respect to the axes of the other rollers so as to cause the divergent progressive tearing of the plastics film from the incision of the film adjacent the superimposed margin.

3. An automatic tearing device according to claim 1 wherein the upper incision roller receives the rotation through two pairs of orthogonal helical gear wheels and a drive helical gear wheel is mounted in a slide to be translatively controlled so as to synchronize the incision roller with the drive of the coupling machine without stopping the machine.

4. An automatic tearing device according to the claim 1 wherein the shaft for the upper incision roller and the lower co-operating roller are mounted in a second slide so as to alter the distance of the spikes of the upper incision roller from the adjacent surface of the co-operating lower rubber covered roller.

5. An automatic tearing device according to the preceding claim 4, wherein upstream of the incision rollers there is provided a slide grate acting as a guide support for the two subsequent coupled sheets just before the tearing operation.

References Cited

UNITED STATES PATENTS 3,384,523  5/1968  Bender _____ 225—2 X

JAMES M. MEISTER, Primary Examiner

U.S. Cl. X.R.

225—100